(12) United States Patent
Ochiai et al.

(10) Patent No.: US 6,335,574 B1
(45) Date of Patent: Jan. 1, 2002

(54) CONTROL APPARATUS FOR HYBRID VEHICLE

(75) Inventors: Shinobu Ochiai; Kazuhiro Hara, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/643,711

(22) Filed: Aug. 23, 2000

(30) Foreign Application Priority Data

Aug. 25, 1999 (JP) .......................................... 11-238947

(51) Int. Cl.$^7$ ................................................ F02N 11/06
(52) U.S. Cl. ...................................... 290/40 C; 290/17
(58) Field of Search ................................ 290/40 C, 17, 290/16, 50; 701/113, 22; 123/179.1; 180/65.2, 65.3, 65.4

(56) References Cited

U.S. PATENT DOCUMENTS

| | | | | |
|---|---|---|---|---|
| 5,359,228 A | * | 10/1994 | Yoshida | 290/17 |
| 5,441,122 A | * | 8/1995 | Yoshida | 180/65.2 |
| 5,697,466 A | * | 12/1997 | Moroto et al. | 180/65.2 |
| 5,927,415 A | * | 7/1999 | Ibaraki et al. | 180/65.2 |
| 6,018,199 A | * | 1/2000 | Shiroyama et al. | 290/37 A |
| 6,073,456 A | * | 6/2000 | Kawai et al. | 62/133 |
| 6,137,250 A | * | 10/2000 | Hirano et al. | 318/376 |
| 6,253,127 B1 | * | 6/2001 | Itoyama et al. | 701/22 |

FOREIGN PATENT DOCUMENTS

| | | |
|---|---|---|
| JP | 07123509 | 5/1995 |
| JP | 11-270445 | * 3/1998 |
| JP | 10136508 | 5/1998 |

* cited by examiner

*Primary Examiner*—Joseph Waks
(74) *Attorney, Agent, or Firm*—Arent Fox Kintner Plotkin & Kahn, PLLC

(57) ABSTRACT

The hybrid vehicle having an engine, an electric motor, a starter motor that starts the engine, and a power drive unit that drives the electric motor. The control apparatus includes an engine start controller which starts the engine when an engine start is requested. The engine start controller starts the engine using the electric motor if the temperature of the electric motor or the power drive unit is less than a predetermined value. In contrast, if at least one of the temperature of the electric motor or the power drive unit is no less than the predetermined value, the engine start controller starts the engine using the starter motor.

6 Claims, 4 Drawing Sheets

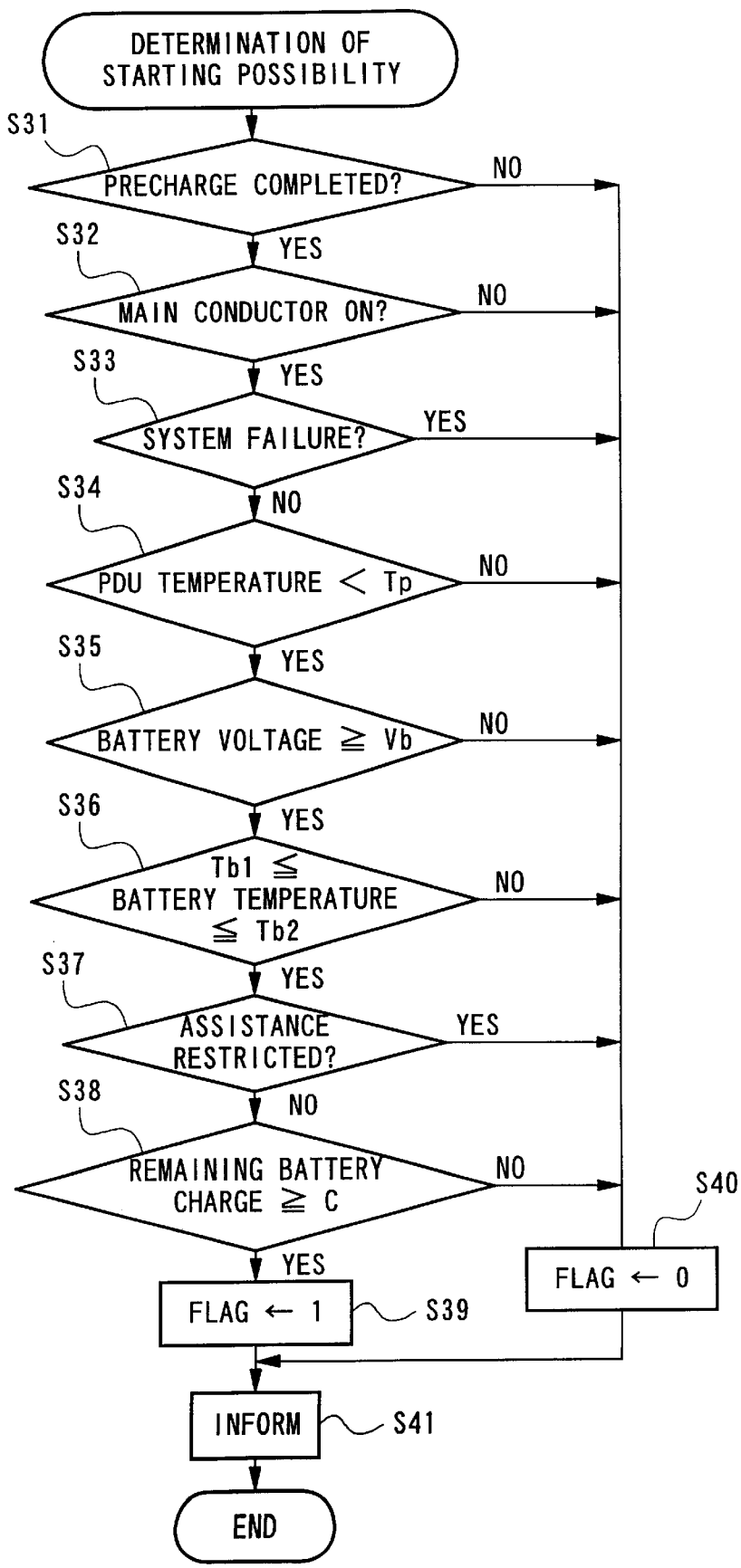

CONTROL APPARATUS FOR HYBRID VEHICLE

BACKGROUND OF THE INVENTION

1. Field of the Invention

The present invention relates to a control apparatus and control method for a hybrid vehicle. In particular, the present invention relates to a technique for starting an engine selectively using an electric motor which generates the driving force for the vehicle or using a starter motor which is a motor dedicated for starting the engine, in accordance with the state of the vehicle.

2. Description of Related Art

Conventionally, hybrid vehicles which carry electric motors as power sources for driving the vehicles in addition to engines are known. As kinds of hybrid vehicles, there are parallel hybrid vehicles in which an electric motor is used as an assisting driving source for assisting the output of the engine. These parallel hybrid vehicles perform various controls, for example, when the vehicle accelerates, the electric motor assists the output of the engine, and when the vehicle decelerates, the electric motor generates electric power by deceleration regeneration to charge a battery, etc. Therefore, it is possible to constantly maintain electrical energy (the remaining battery charge) in the battery and to respond to demands made by the driver on the vehicle. For example, Japanese Unexamined Patent Application, First Publication No. Hei 7-123509 discloses such a control technique.

In the hybrid vehicle, it is not only possible to start the engine using a starter motor dedicated for starting the engine, but also it is possible to start the engine using a driving motor for running the vehicle.

However, in conventional hybrid vehicles, when starting the engine, the selection of the starter motor or the driving motor has not been appropriately performed while taking into consideration the protection of various devices and parts in the hybrid vehicles.

Moreover, in the conventional hybrid vehicles, when starting the engine, the selection of the starter motor or the driving motor has not been appropriately performed in consideration of the case where drivers wish to start the engine quickly.

SUMMARY OF THE INVENTION

The object of the present invention is to provide a controlling apparatus and method for a hybrid vehicle in which the selection of the starter motor or the driving motor can be appropriately performed to start the engine while taking into consideration the protection of various devices and parts in the hybrid vehicle.

Another object of the present invention is to provide a controlling apparatus and method for a hybrid vehicle in which the selection of the starter motor or the driving motor can be appropriately performed for starting the engine when the driver wishes to start the engine quickly.

In order to achieve the above object, the control apparatus according to the first aspect of the present invention comprises an engine start controller which starts the engine when an engine start is requested. The engine start controller starts the engine using the electric motor if the temperature of the electric motor or the power drive unit is less than a predetermined value, and the engine start controller starts the engine using the starter motor if the temperature of the electric motor or the power drive unit is no less than the predetermined value.

Similarly, the control method according to the first aspect of the present invention comprises determining whether the temperatures of the electric motor and the power drive unit are respectively less than a predetermined values when an engine start is requested; starting the engine using the electric motor in the case where the temperature of the electric motor or the power drive unit is less than a predetermined value; and starting the engine using the starter motor in the case where the temperature of the electric motor or the power drive unit is no less than the predetermined value.

The starter motor is designed to have a maximum rotational speed (for example, 200 r.p.m.) which is just sufficient for starting the engine. In contrast, the electric motor for generating the driving force of the vehicle can output a torque much higher than that of the starter motor, and also has a wider speed range so as to correspond to the whole speed range of the engine. Also, the engine can be started more smoothly and silently when the starting operation is performed at a higher rotational speed for the structural reasons of the engine, etc. Therefore, in the control apparatus and method according to the first aspect, when an engine start is requested, if the vehicle is in a normal state, that is, if the temperatures of the electric motor and the power drive unit are respectively less than a predetermined values, the engine start controller starts the engine using the electric motor which can drive the engine at a high rotational speed (for example, about 2000 r.p.m.). However, if at least one of the temperatures of the electric motor and the power drive unit is no less than the predetermined values, the engine start controller starts the engine using the starter motor, instead of using the electric motor.

That is, if at least one of the temperatures of the electric motor and the power drive unit reaches a temperature which may cause a breakdown or a shortening of the life time of the electric motor or the power drive unit, the driving source for starting the engine is changed from the electric motor to the starter motor. Therefore, according to the first aspect of the present invention, it is possible to appropriately select one of the starter motor and the electric motor in consideration of protection of the electric motor and the power drive unit of the hybrid vehicle.

The control apparatus according to the second aspect of the present invention comprises an engine start controller which starts the engine when an engine start is requested, and the engine start controller starts the engine using the electric motor if the temperature of the power storage unit is within a predetermined temperature range. In contrast, the engine start controller starts the engine using the starter motor if the temperature of the power storage unit is not within the predetermined temperature range.

Similarly, the control method according to the second invention comprising determining whether the temperature of the power storage unit is within a predetermined temperature range when an engine start is requested; starting the engine using the electric motor in the case where the temperature of the power storage unit is within a predetermined temperature range; and starting the engine using the starter motor in the case where the temperature of the power storage unit is not within the predetermined temperature range.

In this second aspect of the present invention, when an engine start is requested, if the vehicle is in a normal state, that is, if the temperature of the power storage unit is within a predetermined temperature range in which the electric motor can start the engine, the engine start controller starts the engine using the electric motor. However, if the temperature of the power storage unit is not within the predetermined temperature range, the engine start controller starts the engine using the starter motor instead of using the electric motor.

That is, when the temperature of the power storage unit is a temperature which may cause a shortening of the life time of the power storage unit if the engine is started using the electric motor, the driving source for starting the engine is changed from the electric motor to the starter motor. Therefore, according to the second aspect, it is possible to appropriately select one of the starter motor and the electric motor in consideration of protection of the power storage unit of the hybrid vehicle.

The control apparatus according to the third aspect of the present invention comprises an engine start controller which starts the engine when an engine start is requested, the engine start controller starts the engine using the electric motor if a contactor is connecting the power drive unit to the power storage unit, and the engine start controller starts the engine using the starter motor if the contactor is not connecting the power drive unit to the power storage unit.

Similarly, the control method for a hybrid vehicle comprises determining whether the contactor is connecting the power drive unit to the power storage unit when an engine start is requested; starting the engine using the electric motor in the case where the contactor is connecting the power drive unit to the power storage unit; and starting the engine using the starter motor in the case where the contactor is not connecting the power drive unit to the power storage unit.

The state in which the contactor is not connecting the power drive unit to the power storage unit includes, for example, the state in which the contactor is being turned off because the precharging of the power drive unit by the power storage unit has not been completed. In such a case, electric power is not being supplied to the electric motor, and the electric motor cannot be used for starting the engine. However, even in such a case, if the driver wishes to start the engine before the completion of the precharging, because the driving source for starting the engine is automatically changed from the electric motor to the starter motor by the engine start controller, it is possible to rapidly start the engine without waiting for the completion of the precharging. Therefore, according to the third aspect of the present invention, the starting of the engine can be performed in accordance with the demand of the driver.

Furthermore, the state in which the contactor is not connecting the power drive unit to the power storage unit includes the state in which the contactor is broken. Even in such a case, the driving source for starting the engine is automatically changed from the electric motor to the starter motor by the engine start controller. Therefore, according to the third aspect of the present invention, even in the state where the electric motor does not work because of a breakdown of the contactor, it is possible to start the engine and to drive the vehicle only by the engine.

BRIEF DESCRIPTION OF THE DRAWING

FIG. 4 is a flowchart illustrating steps for determining whether the electric motor can start the engine in the embodiment.

DETAILED DESCRIPTION OF THE INVENTION

Hereinafter, a preferred embodiment of the control apparatus and control method for a hybrid vehicle according to the present invention will be explained referring to the figures.

Figure 1:
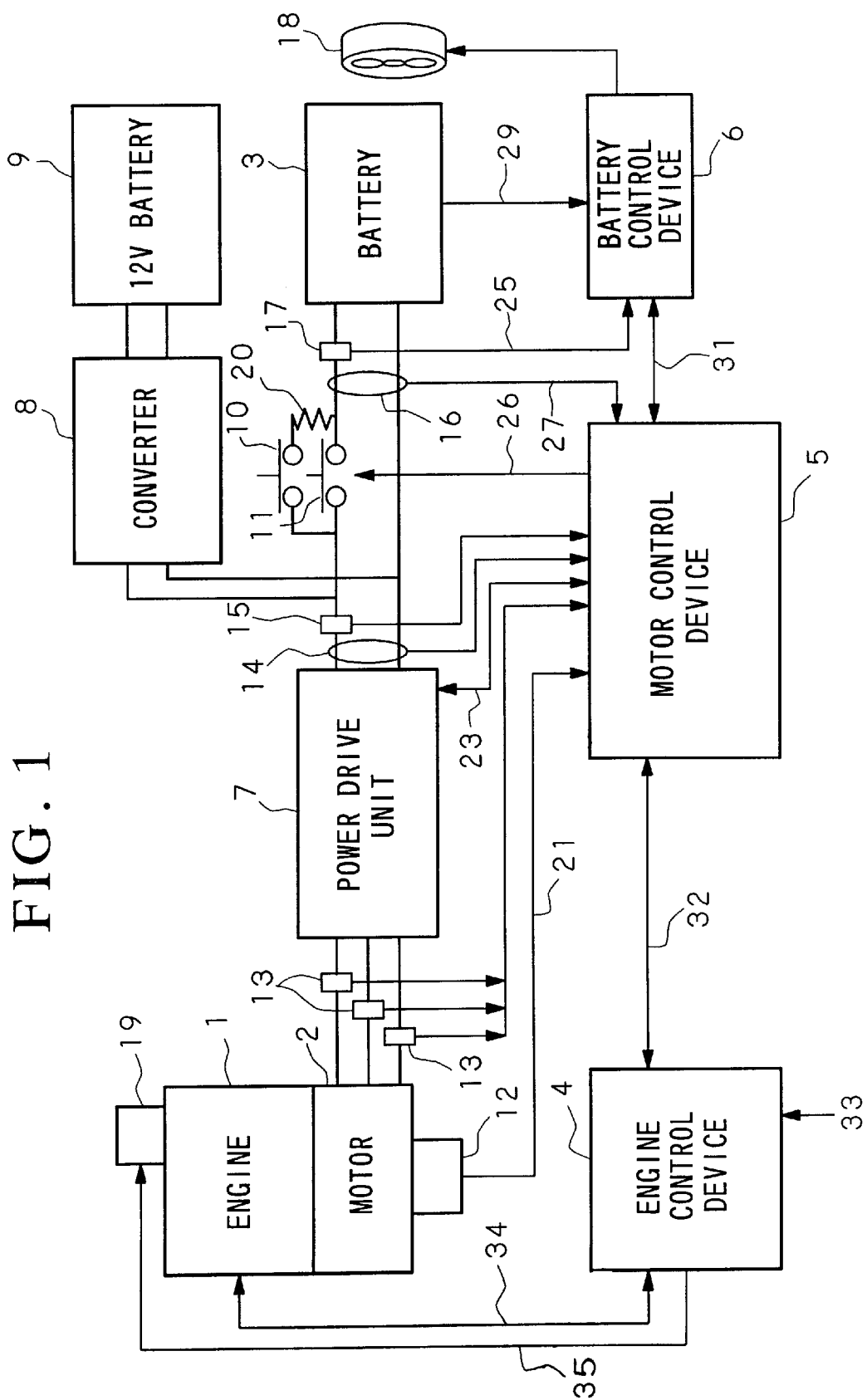
FIG. 1 is a block diagram of a hybrid vehicle to which an embodiment of the control apparatus according to the present invention is applied.

FIG. 1 is a block diagram illustrating a parallel hybrid vehicle in which an embodiment of the present invention is applied. The vehicle comprises an engine 1 which is activated by the combustion energy of a fuel, and an electric motor which is activated by electric power and assists the engine 1. The driving force generated by both the engine 1 and the electric motor 2 is transmitted via an automatic or a manual transmission (not shown) to driving wheels (not shown). At the time of the deceleration of the hybrid vehicle, the driving force is transmitted from the driving wheels to the electric motor 2, the electric motor 2 functions as a generator. That is, the electric motor 2 recovers the kinetic energy of the vehicle body as electric energy, and the recovered electric energy is used for charging a battery 3 which will be explained later. The vehicle may comprise a generator dedicated for charging the battery 3 in addition to the driving motor (electric motor) 2.

The battery 3 is a high voltage battery includes a plurality of modules connected in series, and in each module, a plurality of cells are connected in series. A dedicated starter motor 19 (cell motor) is provided for starting the engine 1.

An engine control device 4 is provided for controlling the engine 1. This engine control device 4 monitors the engine speed and the velocity of the vehicle, etc. at predetermined intervals, and determines the mode of the vehicle such as a regeneration mode, an assistance mode, and a deceleration mode, based on the results of the monitoring. The engine control device 4 also computes the assistance amount or the regeneration amount in correspondence with the determined mode, and transmits the information regarding the mode and the assistance/regeneration amount, etc. to a motor control device 5. Based on the information received from the engine control device 4, the motor control device 5 controls a power drive unit 7, etc. so as to drive the electric motor 2 or to perform the regeneration by the electric motor 2. A battery control device 6 is provided for computing the remaining battery charge SOC (state of charge) of the battery 3. This battery control device 6 also controls an electric fan 18 provided near the battery 3 in order to maintain the battery temperature lower than a predetermined value and to protect the battery 3.

In this embodiment, the engine control device 4, the motor control device 5, and the battery control device 6 are constructed by a CPU (central processing unit) and a memory, and their functions are actualized by running a suitable program in the CPU and the memory.

The power drive unit 7 comprises three modules connected in parallel, and each module consists of two switching elements connected in series. Each of the switching modules in the power drive unit 7 is turned on or off by the motor control device 5, and high voltage DC currents supplied to the power drive unit 7 from the battery 3 are supplied to the electric motor 2 via three phase lines.

The 12-V (auxiliary) battery 9 is provided for driving various accessories, and the 12-V battery 9 is connected to the battery 3 via a downverter 8. This downverter 8 reduces the voltage from the battery 3 and supplies the reduced voltage to the 12-V battery 9. The battery 3 and the power drive unit 7 are connected to each other via a precharging contactor 10 and a main contactor 11, and the precharging contactor 10 and the main contactor 11 are respectively turned on and off by the motor control device 5.

A motor sensor 12 is provided for detecting the rotational phase and the rotational speed of the motor 2, and current sensors 13 are provided respectively for measuring the electric currents Iu, Iv, and Iw flowing through the three phase lines. The signals output from the motor sensor 12 and the current sensors 13 are transmitted to the motor control device 5.

A voltage sensor 14 and a current sensor 15 are provided respectively for measuring the voltage Vpdu and the current Ipdu to be input to the power drive unit 7. Furthermore, a voltage sensor 16 is provided for measuring the voltage of the battery 3. The voltage values and the current values measured by the sensors 14 to 16 are transmitted to the motor control device 5. A current sensor 17 is provided for measuring the current flowing in or out of the battery 3, and the measured current value is transmitted to the battery control device 6.

As is described above, the sensors 14 to 17 measures the voltage and the current at the battery 3 side of the contactors 10 and 11, and the voltage and the current at the power drive unit 2 side of the contactors 10 and 11. The current value output from the current sensor 15 corresponds to the value obtained by subtracting the current value flowing into the downverter 8 from the current value measured by the current sensor 17.

Next, the control procedure of the above control apparatus will be explained. First, the battery control device 6 computes the remaining battery charge based on the current value 25 and voltage value 29 at the side of the battery 3, and transmits the remaining battery charge to the motor control device 5. The motor control device 5 outputs the received remaining battery charge to the engine control device 4.

The engine control device 4 determines the driving mode (assistance mode, regeneration mode, starting mode, deceleration mode, etc.) and the electric power necessary for driving the electric motor 2, based on the battery remaining charge, the engine speed, the degree of throttle opening, the engine torque, and the actual motor torque, etc., and the engine control device 4 outputs the driving mode information and the necessary electric power information to the motor control device 5.

On receiving the driving mode information and the necessary electric power information from the engine control device 4, the motor control device 5 controls the power drive unit 7 as follows:

(i) When it is in the assistance mode or the deceleration mode, the motor control device 5 computes the necessary torque so as to equalize the electric power to be input to the power drive unit 7 (at the side of the voltage sensor 14 and the current sensor 15 in FIG. 1) with the necessary electric power indicated by the engine control device 4, and the motor control device 5 feedback-controls the power drive unit 7 so that the electric motor 2 generates the necessary torque.

(ii) When it is in the cruise mode, the motor control device 5 computes the necessary torque so as to equalize the electric power to being supplied to the battery 3 (at the side of the voltage sensor 16 and the current sensor 17 in FIG. 1) with the necessary electric power indicated by the engine control device 4, and the motor control device 5 feedback-controls the power drive unit 7 so that the electric motor 2 generates the necessary torque.

(iii) When it is in the starting mode, the motor control device 5 controls the power drive unit 7 and controls the starting of the engine using the electric motor 2.

Next, the motor control device 5 receive data regarding the actual torque from the power drive unit 7, and transmits the data to the engine control device 4.

The engine control device 4, the motor control device 5, and the battery control device 6 perform the above procedure at a predetermined timing so as to control the engine 1, the electric motor 2, and the battery 3, and to drive the vehicle.

Figure 2:
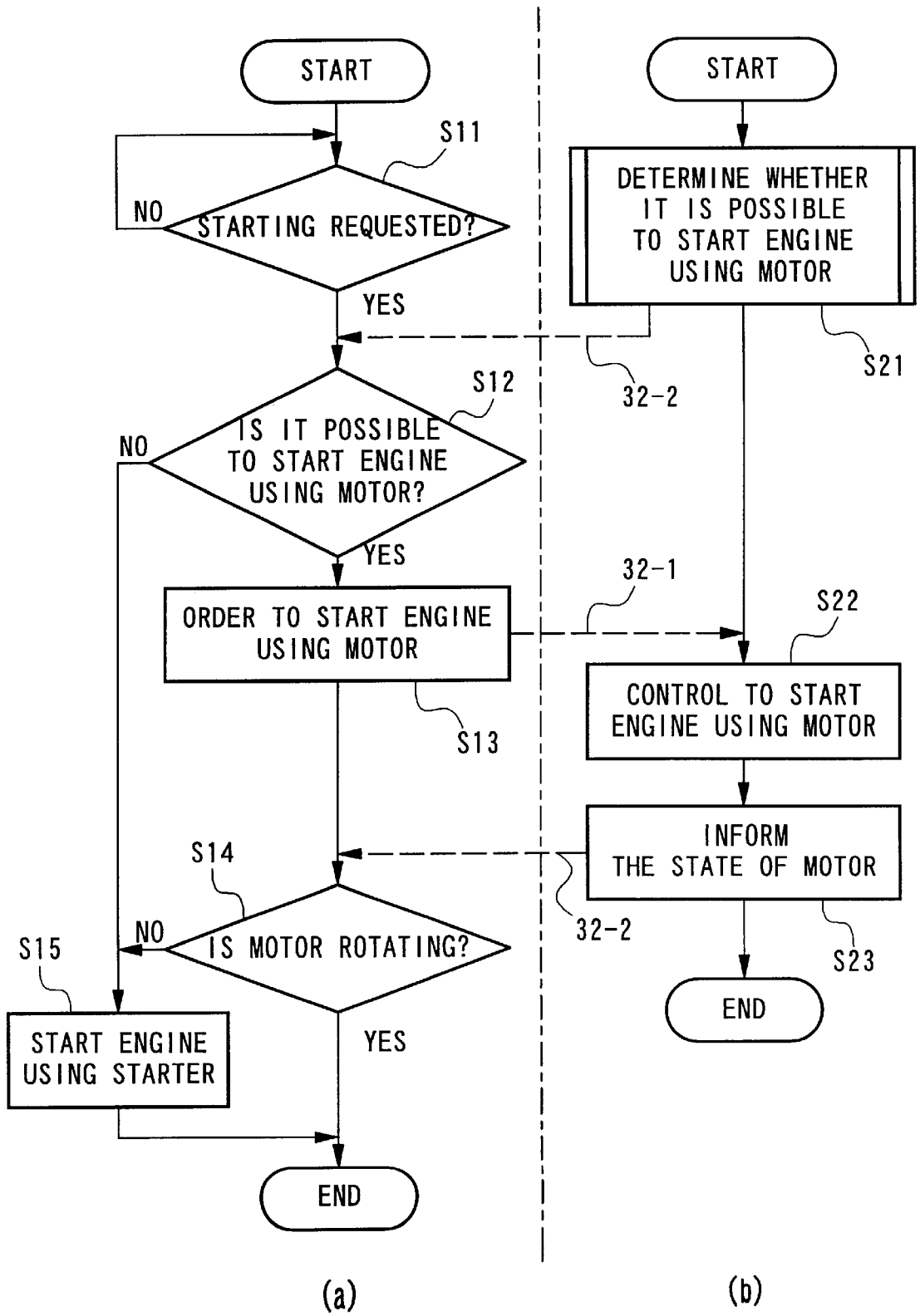
FIG. 2 is a flowchart illustrating steps for controlling the starting of the engine in the embodiment.
Figure 3:
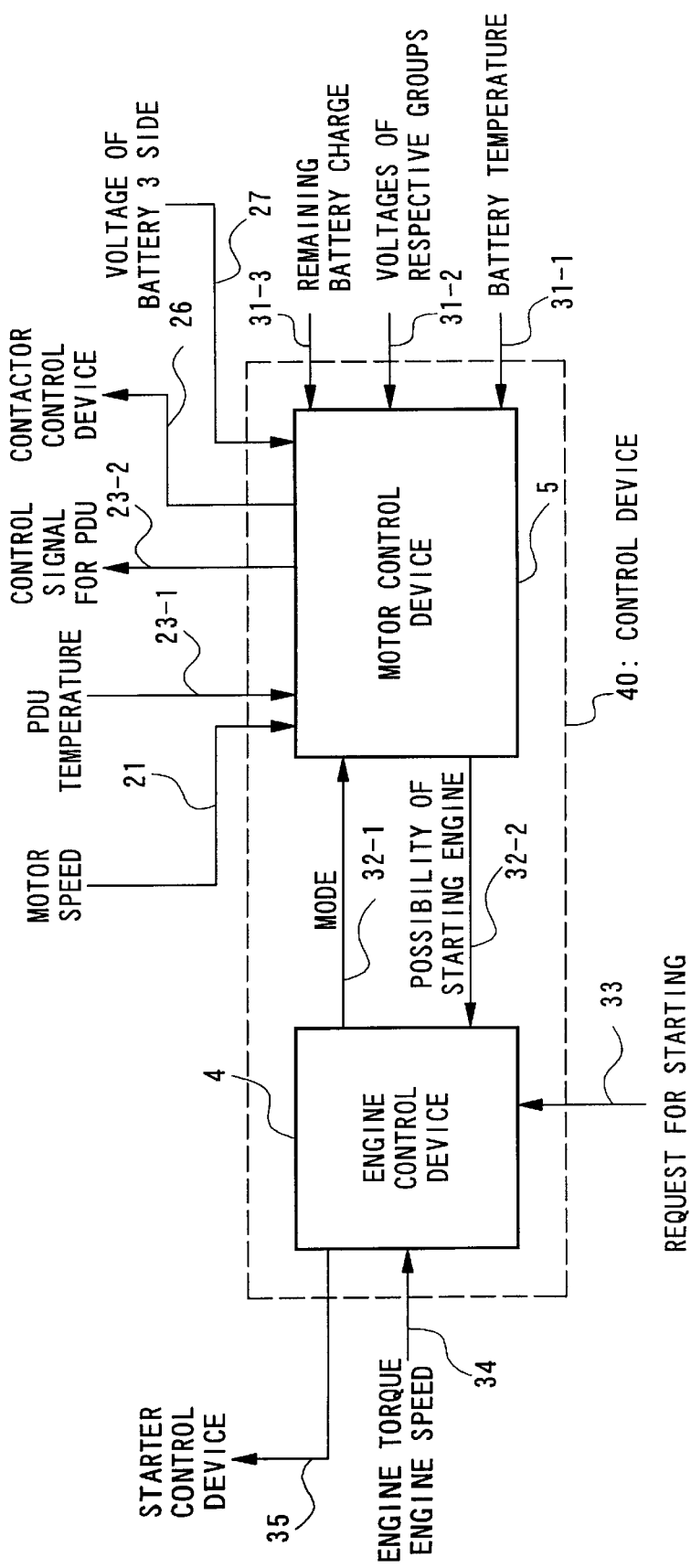
FIG. 3 is a block diagram illustrating in detail the input/output signals of the control apparatus of the embodiment.

Next, the operation of the control apparatus at the time of starting the engine 1 of the hybrid vehicle will be explained referring to FIGS. 2 through 4. FIG. 2 is a flowchart illustrating the steps by the engine control device 4 and the motor control device 5 when starting the engine 1. The flow (a) in FIG. 2 depicts the operation of the engine control device 4, and the flow (b) in FIG. 2 depicts the operation of the motor control device 5. FIG. 3 illustrates various signals input to or output from the control apparatus 40 when starting the engine 1, and, in FIG. 3, the signals which correspond to the signals illustrated in FIG. 1 are denoted by the same reference number as those in FIG. 1. In order to differentiate plural signals corresponding to the same signal (x), a hyphen and a subnumber (for example, x-1, x-2, . . . ) have been added to some reference numbers. As shown in FIG. 3, the control apparatus 40 of the present embodiment consists of the engine control device 4 and the motor control device 5.

In the flow shown in FIG. 2, first, the ignition switch of the hybrid vehicle is turned on, the control devices 4 to 6 are supplied with electric power from the 12-V battery 9, and initialization procedures including the initializations of flags in the control devices 4 to 6 are performed.

According to the flow of FIG. 2, in summary, the control apparatus (engine start controller) 40 starts the engine 1, when the engine start is requested, using the electric motor 2 if the state is normal. However, if it is not possible for the electric motor 2 to start the engine 1 because of abnormalities in the devices and parts relating to the electric motor 2 such as the power drive unit 7 and the battery 3, the control apparatus 40 starts the engine 1 using the starter motor 19. The details of the control procedure will be explained hereinafter.

First, in step S11, the engine control device 4 determines if the engine start is requested. As shown in FIG. 3, the engine control device 4 receives the engine start request signal 33 which corresponds to the ON/OFF state of a starter switch. The engine control device 4 detects the engine start request signal 33 in accordance with a predetermined process, which is different from the process for starting the engine 1, at a predetermined timing, and sets a predetermined flag in accordance with the ON/OFF state of the starter switch. Therefore, the engine control device 4 can determine whether there is an engine start request 33 by checking the flag relating the ON/OFF state of the starter switch. If the engine starter switch is in an OFF state ("No" in step S11), the engine control device 4 will repeat checking the flag relating the state of the starter switch after a predetermined period of time. In contrast, if the engine starter switch is in an ON state ("Yes" in step S11), the engine control device 4 performs the next step S12.

On the other hand, in step S21, the motor control device 5 determines whether it is possible to start the engine 1 using the electric motor 2. The procedure in step S21 will be explained in detail referring to FIG. 4. The procedure in step S21 will be repeated at predetermined intervals until the motor control device 5 will receive a predetermined signal from the engine control device 4.

In step S31 shown in FIG. 4, the motor control device 5 determines whether the precharging of the power drive unit (hereinafter, referred as "PDU") 7 by the battery 3 is completed. The precharging of the PDU 7 means the precharging of a condenser (not shown) in the PDU 7, and it is performed when the precharging contactor 10 is turned on. When the ignition switch is turned on, the motor control device 5 outputs a contactor control signal 26 so as to turn on only the precharging contactor 10, and sets a flag regarding the precharging state to "OFF" which indicates that the precharging has not been completed. Then, the motor control device 5 performs the procedures for detecting the completion of the precharging in accordance with the process which is different from the process for determining the possibility for starting the engine 1, and, when the precharging is completed, the motor control device 5 sets the flag regarding the precharging to the "ON" state from "OFF" state. The motor control device 5 checks the state of the flag regarding the precharging, and determines whether the precharging has been completed. The determination of the completion of the precharging is performed when a predetermined period of time has passed since the precharging contactor 10 is turned on, or when the difference between voltages measured by the voltage sensors 14 and 16 becomes lower than a predetermined threshold. In general, the precharging of the PDU 7 is completed in 1 to 2 seconds.

If the precharging is not completed in step S31 ("NO" in step S31), the flow proceeds to step S40, and the motor control device 5 sets a flag regarding the possibility of the starting of the engine 1 using the electric motor 2 to "0" which indicates that the electric motor 2 cannot start the engine 1. Then, in step S41, the motor control device 5 informs the engine control device 4 that the electric motor 2 cannot start the engine 1 by transmitting a signal 32-2 shown in FIG. 4. In this way, in the case where the precharging of the PDU 7 is not completed, the motor control device 5 informs the engine control device 4 that the electric motor 2 cannot start the engine 1.

Here, the reason that two contactors 10 and 11 are provided for connecting the PDU 7 and the battery 3 will be explained. When both the contactors 10 and 11 are in OFF states, the voltage of the PDU 7 is about 0 volt, and the voltage of the battery 3 is the rated voltage (for example, 144 volts). If the battery 3 is connected to the PDU 7 via a low resistance, a heavy current flows from the battery 3 to the condenser in the PDU 7, and there is a problem that the contactor mechanism may be broken by the heavy current. In order to avoid this problem, the precharging contactor 10 and a resistor 20 are provided in parallel with the main contactor 11. By turning on only the precharging contactor 10 when precharging the condenser in the PDU 7, it is possible to prevent heavy current from flowing to the PDU 7, and breakdown of the contactor mechanism by the heavy current can be avoided.

When the precharging via the precharging contactor 10 and the resistor 20 is completed, the motor control device 5 outputs a signal 26 so as to turn on the main contactor 11 to connect the battery 3 to the PDU 7 without using the resistor 20, and so as to turn off the precharging conductor 10. Thus, it becomes possible to drive the electric motor 2 using electric power from the battery 3.

Simultaneously, the motor control device 5 changes a flag regarding the state of the main contactor 11 from an "OFF" state to an "ON" state. However, if the main contactor 11 cannot be turned on by the motor control device 5 because of a breakdown of the main contactor 11, the flag regarding the state of the main contactor 11 is maintained in the "OFF" state. Whether or not the main contactor 11 enters the "ON" state can be determined based on whether or not both voltages measured by the voltage sensors 14 and 16 are substantially same.

If the precharging has been completed in step S31 ("Yes" in step S31), the flow proceeds to step S32, and the motor control device 5 determines whether the main contactor is in an ON state by checking the state of the flag regarding the main contactor 11.

If the main contactor 11 is in an "OFF" state ("No" in step S32), the flow proceeds to step S40, and the motor control device 5 sets the flag regarding the possibility of the starting of the engine 1 using the electric motor 2 to "0". Then, in step S41, the motor control device 5 informs the engine control device 4 that the electric motor 2 cannot start the engine 1 by transmitting a signal 32-2 shown in FIG. 3. In this way, if the main contactor 11 cannot be turned on because of a breakdown thereof, the motor control device 5 informs the engine control device 4 that the electric motor 2 cannot start the engine 1.

If the main contactor 11 is in an "ON" state ("Yes" in step S32), the flow proceeds to step S33, the motor control device 5 determines whether the system for controlling the electric motor 2 has any troubles, that is, whether the hardware of the system has broken down. The motor control device 5 performs this determination by checking the signals input to or output from the motor control device 5 and the states of various flags set based on the result of the processing. For example, the breakdown of the motor control system includes:

(i) The abnormality or the breakdown of the motor control device 5 itself.

(ii) The breakage of the three phase lines. Such a breakage can be detected based on the signals from the current sensors 13 shown in FIG. 1.

If the motor control system has broken down ("Yes" in step S33), the motor control device 5 sets in step S40 the flag regarding the possibility of the starting of the engine 1 using the electric motor 2 to "0", and in step S41 the motor control device 5 informs the engine control device 4 that the electric motor 2 cannot start the engine 1 by outputting the signal 32-2. Thus, the motor control device 5 informs the engine control device 4 that the electric motor 2 cannot start the engine 1 when the system has broken down.

When the system has no breakdown ("No" in step S33), the flow proceeds to step S34, and the motor control device 5 determines whether the temperature of the PDU 7 is in a range in which the electric motor 2 can start the engine 1. The PDU 7 includes a plurality of switching elements for switching the currents flowing through the three phase lines connected to the electric motor 2. The PDU 7 also includes at least one temperature sensor (not shown) for measuring the temperature of the PDU 7 which is influenced by the heat of the switching elements, and the signal (23-1 in FIG. 3) output from the temperature sensor is continuously transmitted to the motor control device 5. The motor control device 5 monitors the signal 23-1 in accordance with a program regarding the temperature of the PDU-7, computes the temperature of the PDU 7, and sets the temperature value in a predetermined memory. Furthermore, the motor control device 5 determines whether the temperature value stored in the memory is in the predetermined temperature range in which the electric motor 2 can start the engine 1. In this embodiment, the predetermined temperature range has only an upper limit Tp; however, it may have a lower limit in addition to the upper limit. The upper limit Tp is, for example, 120° C.; however, the present invention is not limited to this temperature.

If the temperature of the PDU 7 is equal to or higher than the upper limit temperature Tp ("No" in step S34), the motor control device 5 sets in step S40 the flag regarding the possibility of the starting of the engine 1 using the electric motor 2 to "0", and informs in step S41 the engine control device 4 that the electric motor 2 cannot start the engine 1 by outputting the signal 32-2. Thus, when the temperature of the PDU 7 is equal to or higher than the upper limit Tp, the motor control device 5 informs the engine control device 4 that the electric motor 2 cannot start the engine 1.

If the temperature of the PDU 7 is lower than the upper limit temperature Tp ("Yes" in step S34), the flow proceeds to step S35, and the motor control device 5 determines whether the voltage of the battery 3 is sufficient for starting the engine 1. The voltage of the battery 3 after turning on the main contactor 11 can be measured by the voltage sensor 16 provided at the side of the battery 3. The signal 27 output from the voltage sensor 16 is continuously transmitted to the motor control device 5. The motor control device 5 monitors the signal 27 in accordance with a program regarding the voltage sensor 16, and stores the measured voltage in a predetermined memory as the voltage of the battery 3. The motor control device 5 compares the voltage value stored in the memory with a predetermined lower limit voltage Vb, and determines whether the voltage of the battery 3 is equal to or higher than the lower limit voltage Vb.

When the voltage of the battery 3 is lower than the lower limit voltage Vb ("No" in step S35), the motor control device 5 sets a predetermined flag to "0" in step S40, and informs the engine control device 4 in step S41 that the electric motor 2 cannot start the engine 1 by transmitting the signal 32-2. Thus, if the voltage of the battery 3 is not sufficiently high for starting the engine 1, the motor control device 5 informs the engine control device 4 that the electric motor 2 cannot start the engine 1.

If the voltage of the battery 3 is equal to or higher than the lower limit voltage Vb ("Yes" in step S35), the flow proceeds to step S36, and the motor control device 5 determines whether the temperature of the battery 3 is in a predetermined range in which the electric motor 2 can start the engine 1. A temperature sensor (not shown) is provided on the battery 3, and this temperature sensor continuously transmits the temperature data of the battery 3 to the battery control device 6. The battery control device 6 further transmits the temperature data of the battery 3 to the motor control device 5 as a signal 31-1 shown in FIG. 3.

The motor control device 5 monitors the signal 31-1 in accordance with a program regarding the temperature of the battery 3, and stores the measured temperature in a predetermined memory. The motor control device 5 compares the temperature stored in the memory with predetermined lower and upper limit temperatures Tb2 and Tb1, and determines whether the temperature of the battery 3 is in the predetermined temperature range. For example, the lower limit temperatures Tb2 and upper limit temperature Tb1 are respectively −20° C. and 60° C. However, the present invention is not limited to this range.

When the temperature of the battery 3 is not in the temperature range ("No" in step S36), the motor control device 5 sets a predetermined flag to "0" in step S40, and informs the engine control device 4 in step S41 that the electric motor 2 cannot start the engine 1 by transmitting the signal 32-2. Thus, if the temperature of the battery 3 is higher than the upper limit temperature Tb1 or is lower than the lower limit temperature Tb2, the motor control device 5 informs the engine control device 4 that the electric motor 2 cannot start the engine 1.

If the temperature of the battery 3 is in the range from Tb2 to Tb1 ("Yes" in step S36), the flow proceeds to step S37, and the motor control device 5 determines whether an assistance restriction is applied to the assist operation by the electric motor 2. The battery 3 comprises a plurality of modules connected in series, and each of the modules comprises a plurality of cells connected in series. The modules are divided into several groups each of which contains a predetermined number of the modules, and voltage sensors are respectively provided for measuring the voltage of each group. Each of these group voltage sensors continuously transmits the voltage data of each group of the modules to the battery control device 6, and the battery control device 6 further transmits the voltage data of the groups to the motor control device 5 as a signal 31-2 shown in FIG. 3.

The motor control device 5 monitors the signal 31-2 in accordance with a program regarding the module voltage in the battery 3, and, if at least one of the voltages of the module groups is lower than a predetermined threshold, the motor control device 5 sets a predetermined flag to a value indicating that the assistance restriction should be applied to the assist operation of the electric motor 2. The motor control device 5 checks the value of the flag, and determines whether an assistance restriction is being applied to the assist operation by the electric motor 2.

When assistance restriction is being applied ("Yes" in step S37), the motor control device 5 sets the predetermined flag to "0" in step S40, and informs the engine control device 4 in step S41 that the electric motor 2 cannot start the engine 1 by transmitting the signal 32-2. Thus, if the assistance restriction is being applied, the motor control device 5 informs the engine control device 4 that the electric motor 2 cannot start the engine 1.

If the assistance restriction is not being applied ("No" in step S37), the flow proceeds to step S38, and the motor control device 5 determines whether the remaining battery charge (SOC: state of charge) is sufficient for the electric motor 2 to start the engine 1. The battery control device 6 continuously receives the temperature of the battery 3, the currents input to and output from the battery 3, and the voltages of the module groups in the battery 3. Based on these data, the battery control device 6 computes the remaining battery charge SOC of the battery 3, and stores the resulted value in a predetermined memory in the battery control device 6. The battery control device 6 then transmits the remaining battery charge SOC to the motor control device 5 as a signal 31-3 shown in FIG. 3.

The motor control device 5 monitors the signal 31-3 in accordance with a program regarding the remaining battery charge, and stores the remaining battery charge in a predetermined memory. The motor control device 5 compares the remaining battery charge stored in the memory with a predetermined lower limit charge C, and determines whether the remaining battery charge of the battery 3 is sufficient for the electric motor 2 to start the engine 1. The lower limit charge C is, for example, 10% of the full battery charge; however, the present invention is not limited to this value.

When the remaining battery charge of the battery 3 is not sufficient ("No" in step S38), the motor control device 5 sets a predetermined flag to "0" in step S40, and informs the engine control device 4 in step S41 that the electric motor 2 cannot start the engine 1 by transmitting the signal 32-2.

Thus, if the remaining battery charge of the battery 3 is not sufficient, the motor control device 5 informs the engine control device 4 that the electric motor 2 cannot start the engine 1.

If the remaining battery charge is sufficient ("Yes" in step S38), that is, all the conditions required by steps S31 to S38 are fulfilled, the flow proceeds to step S39, the motor control device 5 sets the predetermined flag to "1" which indicates that electric motor 2 can start the engine 1, and informs this to the engine control device 4 by the signal 32-2. The above is an explanation of the step S21 in FIG. 2.

Next, in step S11 in FIG. 2, when the starter switch is turned on ("Yes" in step S11), the flow proceeds to step S12, and the engine control device 4 determines whether the electric motor 2 can start the engine 1 based on the signal 32-2 transmitted from the motor control device 5. The engine control device 4 monitors the signal 32-2 in FIG. 3 in accordance with a program regarding the starting using the electric motor 2, and sets a flag "A" to a value corresponding to the content of the signal 32-2. The motor control device 5 repeats step S21 at predetermined intervals (for example, 10 msec.) until receiving a predetermined command from the engine control device 4. Therefore, the flag "A" is regularly updated by the procedure shown in FIG. 4 until the starter switch is turned on.

In the case where the electric motor 2 cannot start the engine 1 ("No" in step S12), the engine control device 4 outputs a control signal 35 so that the starter motor 19 starts the engine 1, and then informs the motor control device 5 that the starter motor 19 started the engine 1. On receiving this signal, the motor control device 5 stops repeating the procedure shown in FIG. 4.

In the general operation of starting the engine, most drivers turn on the starter switch of the engine after a few moments have passed from the time of turning on the ignition switch. Because the precharging of the PDU 7 will take only about 1 to 2 seconds after the turning on of the ignition switch, in general, the main contactor 11 will have been turned on before the starter switch will be turned on. However, some drivers may turn on the starter switch of the engine just after turning on the ignition switch. Even in such a case, the motor control device 5 informs the engine control device 4 that the electric motor 2 cannot start the engine 1 because the main contactor 11 has not been turned on. Therefore, according to the control device of the present embodiment, it is possible to rapidly start the engine using the starter motor 19 without waiting for the turning on of the main contactor 11.

Furthermore, in the case where the main contactor 11 cannot be turned on for some reason such as the breakdown of the main contactor 11, the motor control device 5 informs the engine control device 4 that the electric motor 2 cannot start the engine 1 because the main contactor 11 cannot be turned on, and the driving source for starting the engine 1 is automatically switched from the electric motor 2 to the starter motor 19. Therefore, even in the case of breakdown of the system, it is possible to rapidly start the engine without additional operations, and to drive the vehicle only by the driving force of the engine 1.

In the case where the electric motor 2 can start the engine 1 ("Yes" in step S12), the flow proceeds to step S13, and the engine control device 4 transmits a starting signal (starting mode signal) 32-1 shown in FIG. 3 to the motor control device 5 so that the electric motor 2 starts the engine 1. Thus, unless any troubles occur in the system for starting the engine using the motor, the engine control device 4 commands the motor control device 5 to start the engine 1 using the electric motor 2.

On receiving the starting mode signal 32-1 from the engine control device 4, the flow proceeds to step S22, and the motor control device 5 controls the electric motor 2 so that it rotates at maximum torque. That is, the motor control device 5 outputs a control signal 23-2 shown in FIG. 3 to the PDU 7 so as to repeatedly turn on and off the switching elements in the PDU 7 based on the signals 21 from the motor sensors 12 provided on the motor 3. Thus, the three phase lines connected to the electric motor 2 are supplied with electric currents by turns from the PDU 7, and the electric motor 2 rotates.

In addition, the motor control apparatus 5 determines whether the electric motor 2 actually rotates based on the signal 21 from the motor sensor 12. If the motor control device S determines that the electric motor 2 has begun to rotate within a predetermined period of time after performing step S22, the motor control device 5 sets a predetermined flag to "1". In contrast, if the motor control device 5 determines that the electric motor 2 has not begun to rotate within the predetermined period of time after performing step S22, the motor control device 5 sets the flag to "0". Then, the flow proceeds to step S23, and the motor control device 5 informs the state of the flag to the engine control device 4 by transmitting a signal 32-2.

The engine control device 4 monitors the signal 32-2 from the motor control device 5, and determines in step S14 whether the starting of the engine 1 using the electric motor 2 has been performed normally. If the starting of the engine 1 using the electric motor 2 was not performed normally ("No" in step S14), that is, if the motor was not rotated by the above control, the flow proceeds to step S15, and the engine control device 4 outputs a control signal 35 to the starter motor 19 so as to start the engine 1 using the starter motor 19. Furthermore, in step S15, the engine control device 4 monitors the signal 34 from the engine 1, and, when detecting the starting of the engine 1, the engine control device 4 completes the procedure for starting the engine 1.

In contrast, if the engine 1 was started normally using the electric motor 2 and is rotating ("Yes" in step S14), the engine control device 4 completes the procedure for starting the engine 1. As is explained above, the control apparatus 40 comprising the engine control device 4 and the motor control device 5 performs the starting operation of the engine 1.

Although the above embodiment is applied to a parallel hybrid vehicle in which the driving forces of the engine 1 and the electric motor 2 are combined or distributed, the present invention is not limited to application to parallel hybrid vehicles. The present invention can be applied to various types of the hybrid vehicle such as a hybrid vehicle in which a clutch mechanism is used for connecting or disconnecting the driving force.

Also, the above embodiment includes a control apparatus consisting of an engine control device 4 and a motor control device 5; however, the control apparatus of the present invention is not limited to this type. For example, the control apparatus 40 may comprise other devices for controlling the driving force, for example, the battery control device 6, etc.

The above embodiment uses a battery 3 as the power storage unit; however, the present invention may use a capacitor having a large capacity as the power storage unit.

Furthermore, in the above embodiment, a motor control device 5 determines in step S34 in FIG. 4 whether the electric motor 2 can start the engine 1 based on the temperature of the PDU 7. However, the motor control device 5 may determine whether the electric motor 2 can start the engine 1 based on the temperature of the electric motor 2, or based on both temperatures of the PDU 7 and the electric motor 2. In these cases, a temperature sensor is provided for measuring the temperature of the motor 5, and if the measured temperature is higher than a predetermined upper limit temperature below which the starting operation is possible, the motor control device 5 determines that the electric motor 2 cannot start the engine 1.

The present invention is not limited only to the above embodiment, but can be modified within the scope of the present invention.

What is claimed is:

1. A control apparatus for a hybrid vehicle, which has an engine and an electric motor as driving force sources, a starter motor that starts the engine, and a power drive unit that drives the electric motor, the control apparatus comprising an engine start controller which starts the engine when an engine start is requested, wherein the engine start controller starts the engine using the electric motor if a temperature of the electric motor or the power drive unit is less than a predetermined value, and the engine start controller starts the engine using the starter motor if the temperature of the electric motor or the power drive unit is no less than the predetermined value.

2. A control apparatus for a hybrid vehicle, which has an engine and an electric motor as driving force sources, a starter motor that starts the engine, and a power storage unit that supplies an electric power to the electric motor, the control apparatus comprising an engine start controller which starts the engine when an engine start is requested, wherein the engine start controller starts the engine using the electric motor if a temperature of the power storage unit is within a predetermined temperature range, and the engine start controller starts the engine using the starter motor if the temperature of the power storage unit is not within the predetermined temperature range.

3. A control apparatus for a hybrid vehicle, which has an engine and an electric motor as driving force sources, a starter motor that starts the engine, a power storage unit that supplies an electric power to the electric motor, a power drive unit that drives the electric motor using the electric power from the power storage unit, and a contactor that connects or disconnects the power drive unit to or from the power storage unit, the control apparatus comprising an engine start controller which starts the engine when an engine start is requested, wherein the engine start controller starts the engine using the electric motor if the contactor is connecting the power drive unit to the power storage unit, and the engine start controller starts the engine using the starter motor if the contactor is not connecting the power drive unit to the power storage unit.

4. A control method for a hybrid vehicle, which has an engine and an electric motor as driving force sources, a starter motor that starts the engine, and a power drive unit that drives the electric motor, the control method comprising:

determining whether a temperature of the electric motor or the power drive unit is less than a predetermined value when an engine start is requested;

starting the engine using the electric motor in the case where the temperature of the electric motor or the power drive unit is less than the predetermined value; and starting the engine using the starter motor in the case where the temperature of the electric motor or the power drive unit is no less than the predetermined value.

5. A control method for a hybrid vehicle, which has an engine and an electric motor as driving force sources, a starter motor that starts the engine, and a power storage unit that supplies an electric power to the electric motor, the control method comprising:

determining whether a temperature of the power storage unit is within a predetermined temperature range when an engine start is requested;

starting the engine using the electric motor in the case where the temperature of the power storage unit is within the predetermined temperature range; and starting the engine using the starter motor in the case where the temperature of the power storage unit is not within the predetermined temperature range.

6. A control method for a hybrid vehicle, which has an engine and an electric motor as driving force sources, a starter motor that starts the engine, a power storage unit that supplies an electric power to the electric motor, a power drive unit that drives the electric motor using the electric power from the power storage unit, and a contactor that connects or disconnects the power drive unit to or from the power storage unit, the control method comprising:

determining whether the contactor is connecting the power drive unit to the power storage unit when an engine start is requested;

starting the engine using the electric motor in the case where the contactor is connecting the power drive unit to the power storage unit; and starting the engine using the starter motor in the case where the contactor is not connecting the power drive unit to the power storage unit.

* * * * *